United States Patent
Mielke

(10) Patent No.: US 7,761,987 B2
(45) Date of Patent: Jul. 27, 2010

(54) MANUFACTURING PROCESS FOR COOLING CHANNEL PISTON WITH FORMABLE SHOULDER

(75) Inventor: Siegfried Mielke, Neckarsulm (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 1416 days.

(21) Appl. No.: 10/789,277

(22) Filed: Feb. 27, 2004

(65) Prior Publication Data

US 2004/0168319 A1    Sep. 2, 2004

(30) Foreign Application Priority Data

Mar. 1, 2003    (DE) ................. 103 09 016

(51) Int. Cl.
*B23P 15/10*    (2006.01)
(52) U.S. Cl. .................................. 29/888.04
(58) Field of Classification Search .......... 29/888.04, 29/888.042, 888.043; 92/174, 186
See application file for complete search history.

(56) References Cited

U.S. PATENT DOCUMENTS

| | | | | |
|---|---|---|---|---|
| 3,341,924 A * | 9/1967 | Richmond et al. | ......... | 148/524 |
| 4,587,932 A | 5/1986 | Moebus | ......... | 123/41.35 |
| 4,808,947 A | 9/1986 | Stadler | ......... | 123/41 |
| 4,662,047 A * | 5/1987 | Berchem | ......... | 29/888.04 |
| 4,838,149 A | 6/1989 | Donnison et al. | ......... | 92/222 |
| 4,986,167 A | 1/1991 | Stratton et al. | ......... | 92/186 |
| 5,052,280 A | 10/1991 | Kopf | ......... | 92/186 |
| 5,146,883 A | 9/1992 | Reipert et al. | ......... | 123/193.6 |
| 5,261,363 A | 11/1993 | Kemnitz | ......... | 29/888.044 |
| 5,778,533 A | 7/1998 | Kemnitz | ......... | 29/888 |
| 5,778,846 A | 7/1998 | Mielke | ......... | 123/193.6 |
| 6,026,777 A | 2/2000 | Kemnitz et al. | ......... | 123/193.6 |
| 6,202,619 B1 | 3/2001 | Keller et al. | ......... | 123/193.6 |
| 6,474,220 B2 | 11/2002 | Ries | ......... | 92/186 |
| 6,783,757 B2 | 7/2004 | Huang et al. | ......... | 92/186 |
| 2005/0283976 A1 * | 12/2005 | Otaka | ......... | 29/888.04 |
| 2006/0000087 A1 * | 1/2006 | Huang | ......... | 29/888.04 |
| 2006/0005700 A1 * | 1/2006 | Huang | ......... | 92/186 |
| 2006/0005701 A1 * | 1/2006 | Huang | ......... | 92/186 |

FOREIGN PATENT DOCUMENTS

| | | | |
|---|---|---|---|
| DE | 1210302 | * | 2/1966 |
| DE | 1 301 629 | | 8/1969 |
| DE | 1525895 | * | 6/1975 |
| DE | 36 43 039 | | 6/1988 |
| DE | 41 34 528 | | 5/1992 |
| DE | 41 34 529 | | 5/1993 |
| DE | 44 46 726 | | 6/1996 |

OTHER PUBLICATIONS

Mechanical Engineers' Handbook. John Wiley & Sons, Inc.: Canada. 1986, pp. 920-924.*
English language translation of DE 1210302 (Publication date Feb. 3, 1966).*

* cited by examiner

*Primary Examiner*—John C Hong
(74) *Attorney, Agent, or Firm*—Young Basile

(57) ABSTRACT

Process for manufacturing a cooling channel piston which has a cooling channel approximately in the area behind the ring belt, where a piston blank is shaped at least partially by forging, where in accordance with the invention it is envisaged that a circumferential shoulder is formed in the area of the heat dam also by forging, a recess is introduced behind the shoulder and the shoulder is subsequently reshaped by deformation in such a way that the recess is closed by the shoulder to form a cooling channel.

8 Claims, 7 Drawing Sheets

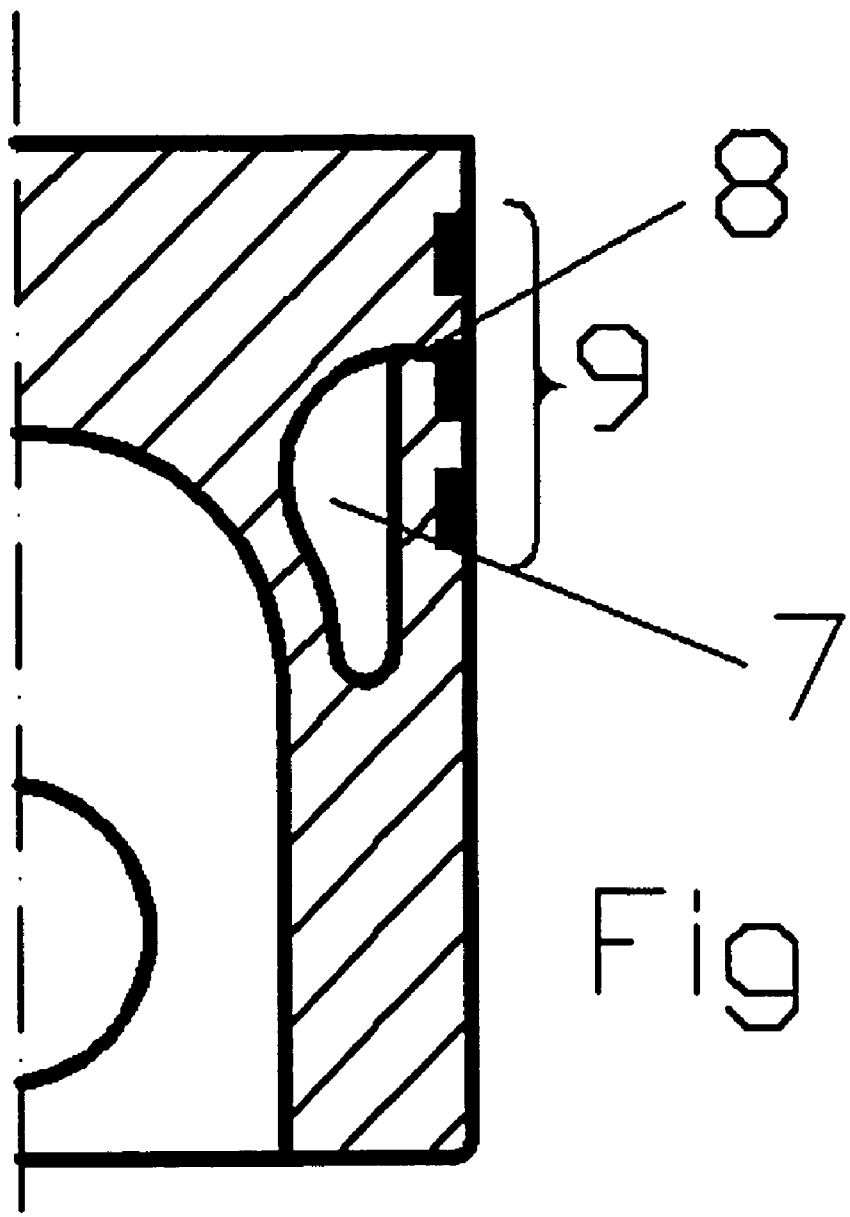

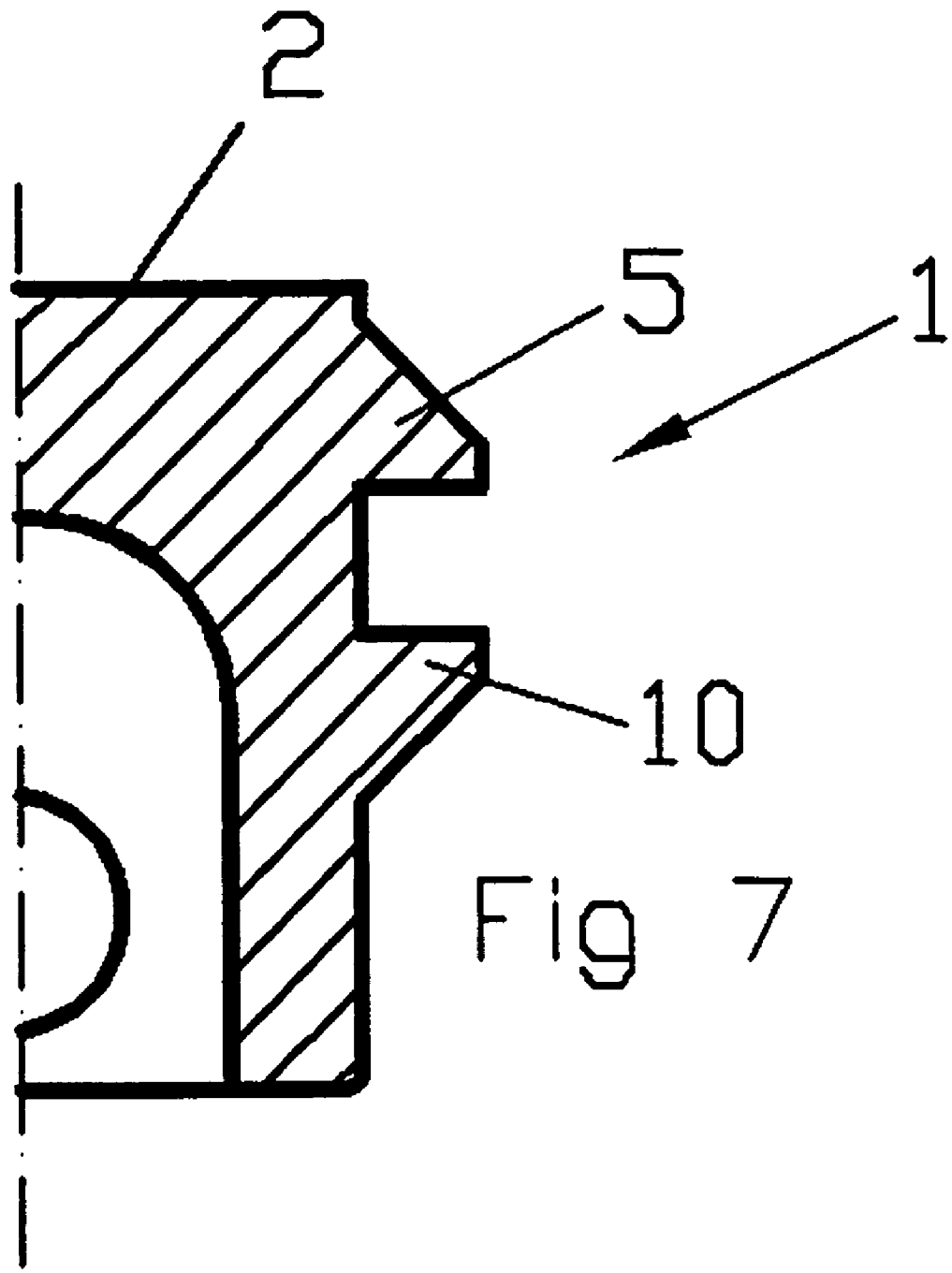

MANUFACTURING PROCESS FOR COOLING CHANNEL PISTON WITH FORMABLE SHOULDER

BACKGROUND

The invention relates to a process for manufacturing a cooling channel piston.

Using a casting or forging process, it is basically known to manufacture blanks for pistons which include a cooling channel after their final machining. Combinations of the two aforementioned processes are also possible. The forging process suggests itself since a piston manufactured by forging has superior strength characteristics compared with a piston manufactured by casting. In the case of piston blanks manufactured by forging, a complex process is required to introduce a cooling channel into this piston blank in the area of the ring belt. In contrast to cast piston blanks, the lost core process cannot be employed with blanks produced by forging. Consequently, introducing the cooling channel using suitable steps causes a recurring problem. The known methods are to introduce a radially circumferential recess through machining by metal-cutting methods and then to close said recess using suitable means. In so doing, close attention must be paid to the dimensional accuracy of the recess and the means that are intended to close this recess. The result is that an additional cost-intensive procedure is required. Because of the necessary dimensional accuracy, it is correspondingly complex to produce the elements involved.

A generic procedure is known from DE 35 02 248 C1 for manufacturing a single-piece piston for a combustion engine by forging. In this process, a piston blank is manufactured having a pre-form collar, where this collar is turned down in the upper area of the piston crown by bending over, creating a piston crown shoulder, which together with an area of a piston crown pre-form creates an annular thermally inhibiting gap. Because the collar is bent over in the upper areas of the piston crown, rounded edges are created initially which require reworking of the lateral and top surfaces of the piston blank. A substantial disadvantage additionally results from the bending, which weakens the piston crown so that a piston manufactured in this way is no longer adequate to meet the demands of modern combustion engines with respect to increased ignition pressures and combustion temperatures required to meet exhaust emissions requirements.

The object of the invention is, therefore, to propose a procedure for manufacturing a piston in which the cooling channel can be produced simply and easily.

SUMMARY

This object is achieved by at least one circumferential shoulder is formed, behind the at least one shoulder a recess is introduced and then the at least one shoulder is reshaped by means of deformation such that the recess is closed by the at least one shoulder to create the cooling channel.

In accordance with the invention, at least one circumferential shoulder is formed during the forging process, specifically in the area of the heat dam of the finished piston, a recess is introduced behind this shoulder and subsequently the shoulder is reshaped such that the recess is closed by the shoulder to create the cooling channel. That is to say, the forged piston blank is manufactured with the circumferential shoulder in the area of the heat dam at approximately the level of the first groove of the ring belt. Advantages result with respect to the strength of the piston, and this circumferential shoulder forms part of the cover of a recess to be introduced in the further course of machining. After the circumferential shoulder has been created, the recess with its upper and lower apical radius and the interior wall is worked into the piston blank, and the thusly formed circumferential lug extending from the piston blank is brought into a form which, after reshaping, closes the cover to create the cooling channel. As the result of suitable bending, which can be the result of forging, for example, swaging, being driven through a hollow form or pressure rolling, the circumferential lug is deformed in the direction of the piston axis and thus closes off the recess, where the closure is effected such that a cavity which forms the subsequent cooling channel remains. After this reshaping, the shoulder is joined solidly to the piston blank where it contacts said blank. This can be accomplished, for example, by welding, soldering, bonding or similar. Alternatively, it is also conceivable that the shoulder is furnished with sealing means in the area where it makes contact with the piston blank. By utilizing sealing means between the piston blank and the circumferential edge of the shoulder, the cooling channel is made oil-tight.

BRIEF DESCRIPTION OF THE DRAWINGS

Manufacturing steps to produce a cooling channel piston, to which the invention is in no way restricted, are explained in what follows and described with reference to the figures.

FIG. 6 shows the positioning of the lower shoulder against the piston blank,

FIG. 7 shows a piston blank with an upper and a lower shoulder.

DESCRIPTION

Figure 1:
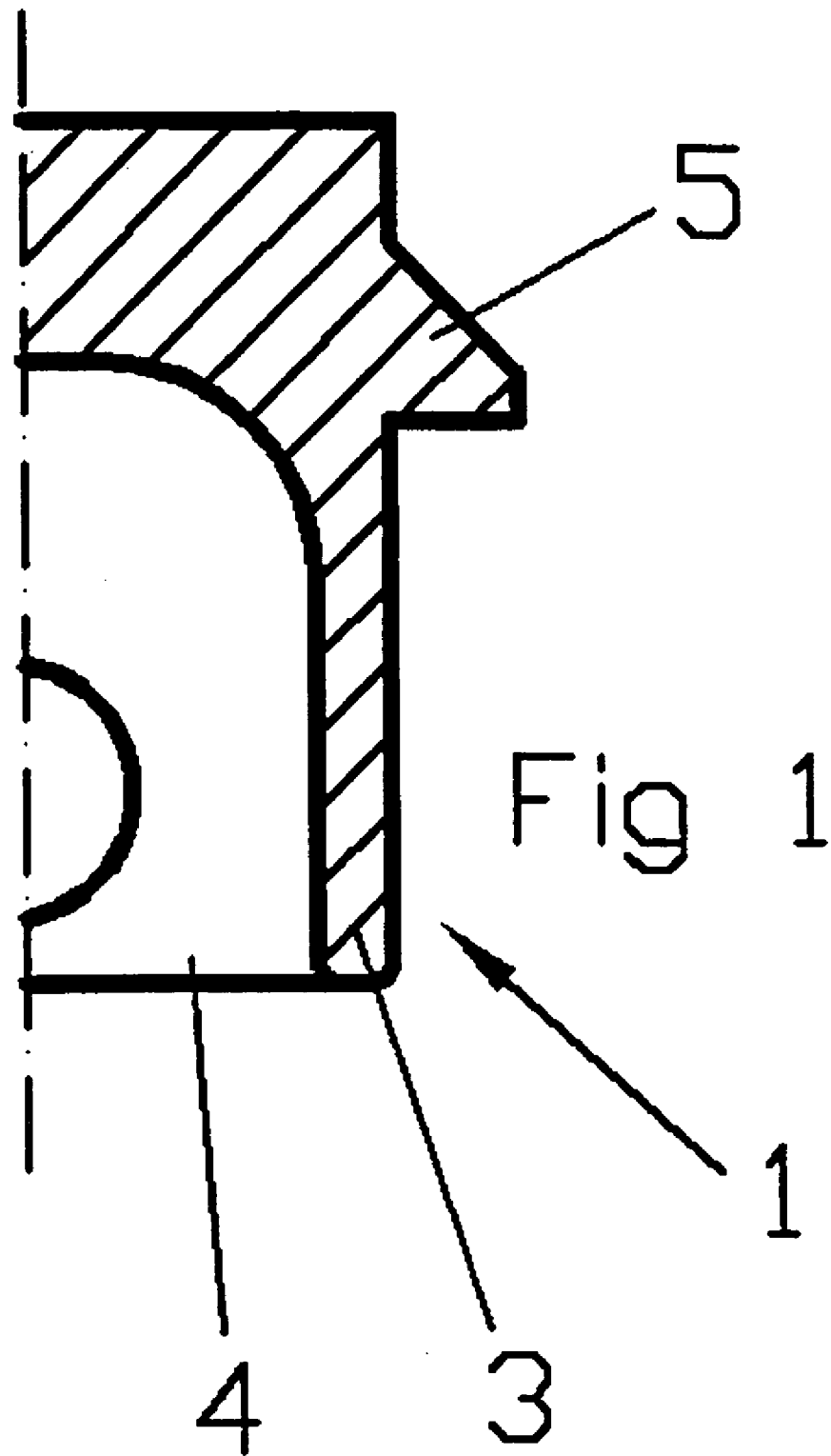
FIG. 1 shows the manufacture of a circumferential upper shoulder.

FIG. 1 shows a simplified drawing of a section from a piston blank 1 which is manufactured at least partially by forging. This piston blank 1 has a piston crown 2 below which piston skirts 3 and piston bosses 4 are disposed in a known way. In the area of the heat dam, which is present in the finished piston, a circumferential shoulder is produced at approximately the level of the first ring groove by forging. The geometric shape of the shoulder 5 is selected such that sufficient material is available to close the recess (not shown in FIG. 1) which forms the subsequent cooling channel.

Figure 2:
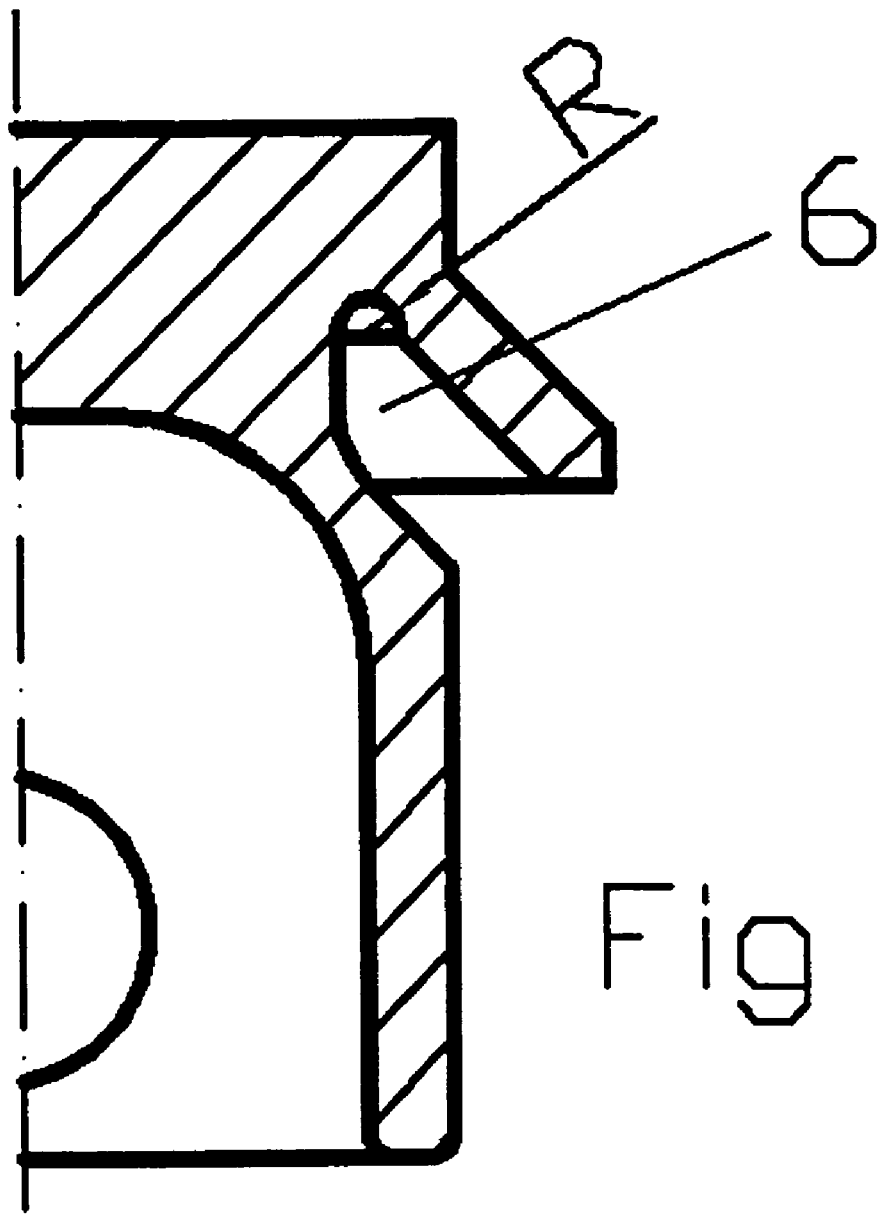
FIG. 2 shows the introduction of a recess and machining of the upper shoulder.

FIG. 2 shows that specifically by a metal-cutting operation a recess 6 with its upper and lower apical radius and the inner wall is worked into the piston blank 1 and the shoulder 5 is brought to a shape which is suitable for closing the recess 6 after reshaping the machined shoulder 5.

Figure 3:
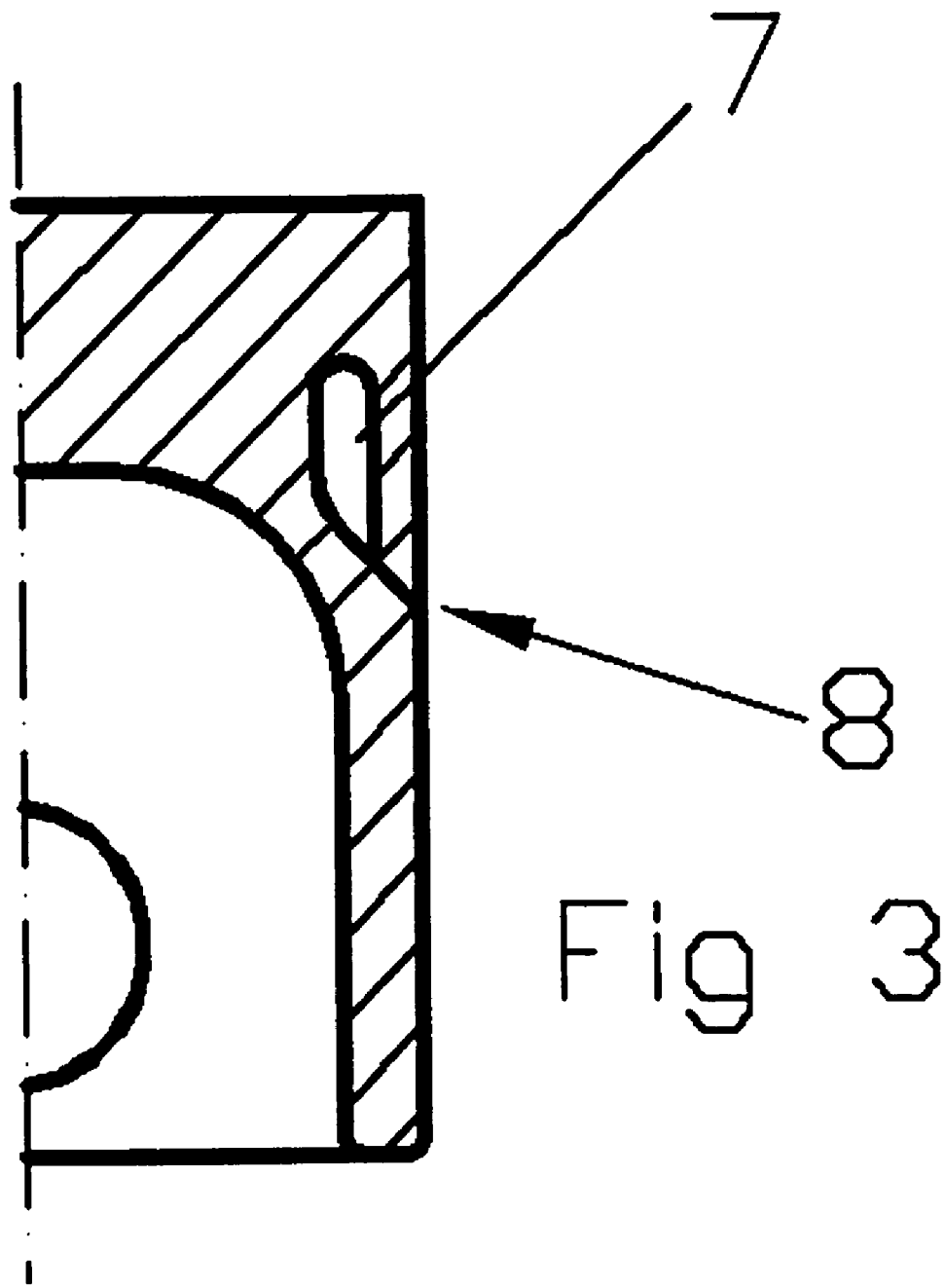
FIG. 3 shows the positioning of the upper shoulder against the piston blank.
Figure 4:
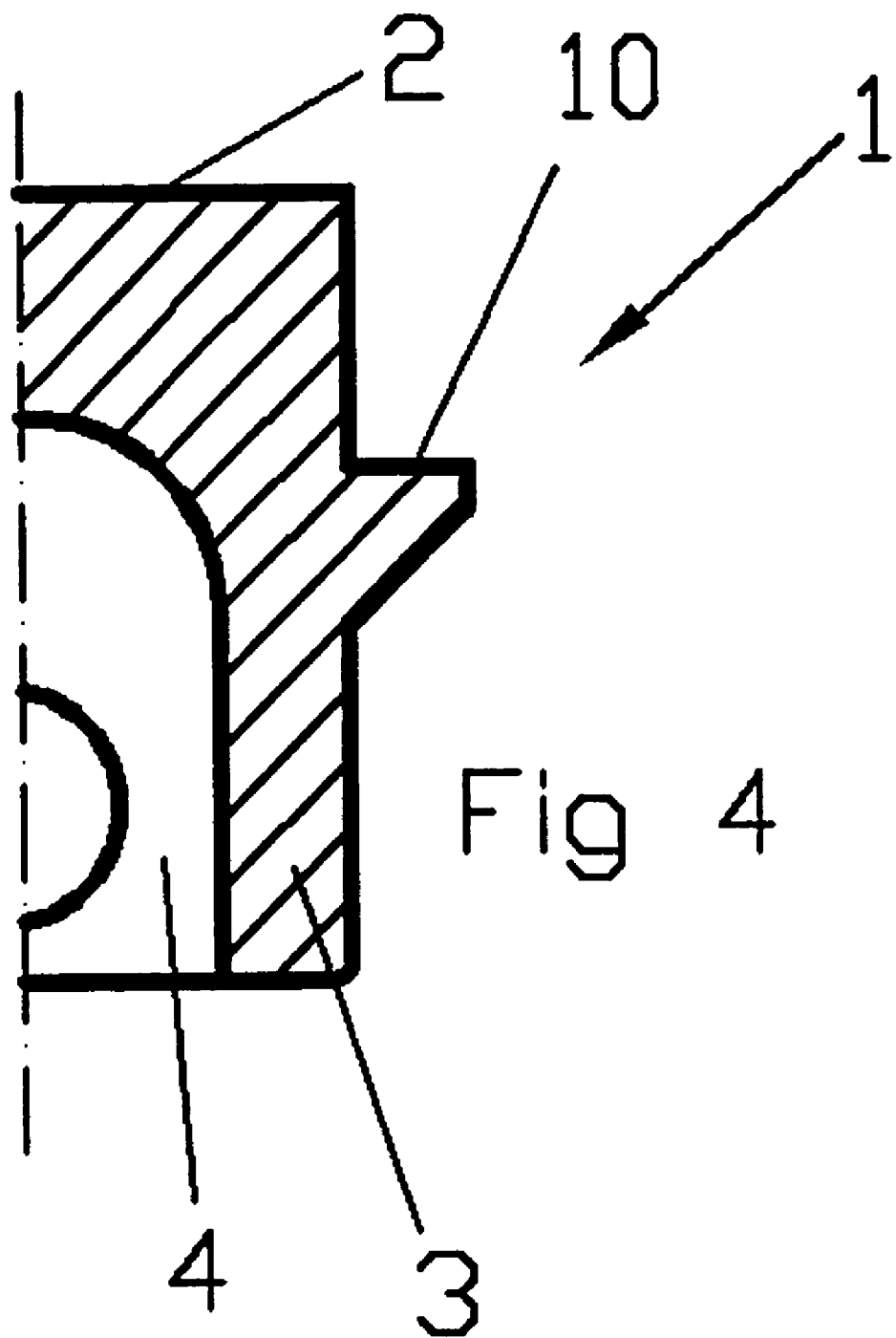
FIG. 4 shows the manufacture of a circumferential lower shoulder.
Figure 5:
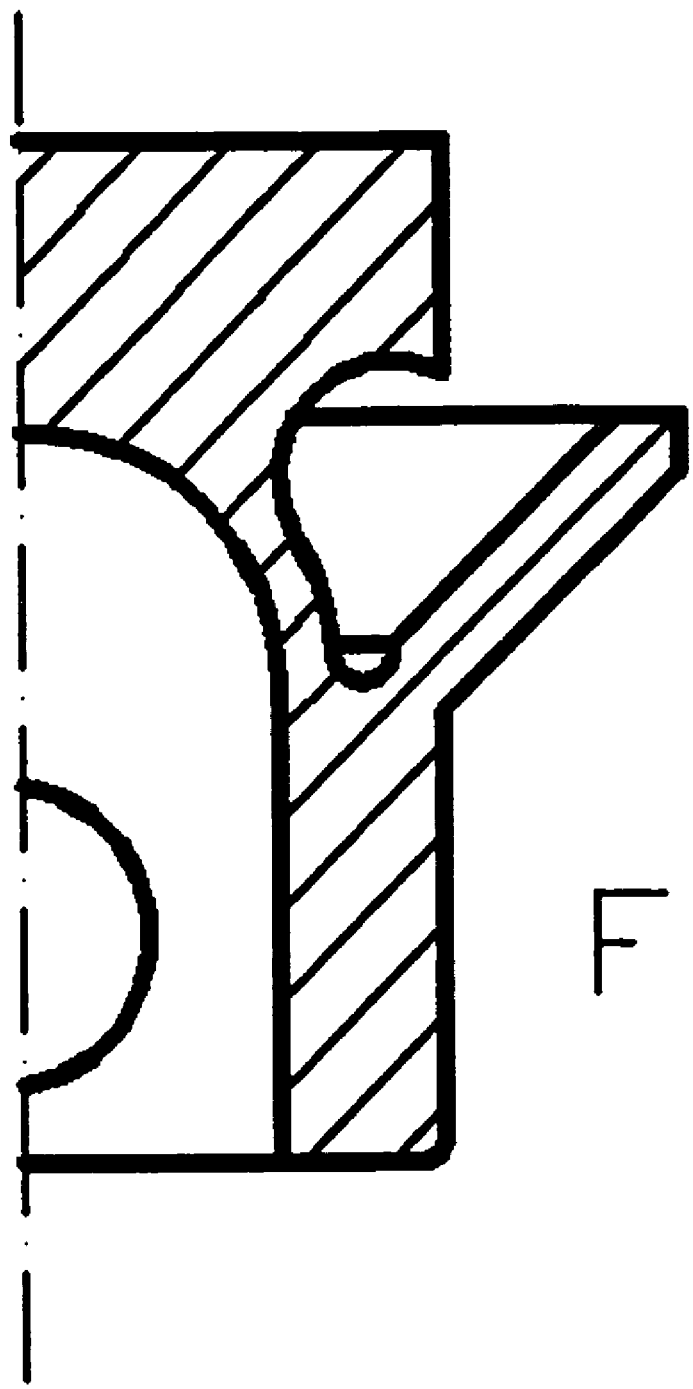
FIG. 5 show the introduction of a recess and machining of the lower shoulder.

FIG. 3 shows the closing of the recess 6 by reshaping the machined shoulder 5. To reshape the machined shoulder, pressure rolling suggests itself since this provides simple shaping with simultaneously good strength characteristics. A proven practice is to heat the area which is to be reshaped by pressure rolling to the necessary forming temperature. This required temperature depends on the geometric characteristics in the reshaping area as well as on the material of which the piston blank 1 consists. After reshaping the reworked shoulder 5, it closes the recess 6 so that the radially circumferential cooling channel 7 is created. The circumferential end of the machined shoulder 5 comes into contact with the piston blank 1 in a zone 8, where the contact surfaces involved are rigidly joined, or sealing elements can be employed to make the cooling channel 7 oil-tight. Subsequently, a second reworking, specifically a machining operation can be performed on the contact area. A further advantage of the reshaped shoulder is that it exhibits the necessary strength to provide a ring belt there.

Analogous to the geometric embodiments and manufacturing steps described for FIGS. 1 to 3, FIGS. 4 to 6 show similar designs and manufacturing steps, with the specific difference that a lower circumferential shoulder is formed, in the case of the piston blank 1 below the piston crown 2. This lower circumferential shoulder 10 is located, for example, at about the level of the crown of the piston boss 4, but it can also be located above or below it. This lower shoulder 10 is also produced by forging the piston blank (FIG. 4), where a recess is also subsequently introduced into the piston blank 1 (FIG. 5) and the machined lower shoulder 10 is then positioned against the piston blank 1 by mechanical shaping in such a way that the cooling channel 7 is created (FIG. 6). The lateral surfaces of the piston blank 1 are then machined, specifically to introduce the recesses for the ring belt 9.

Finally, FIG. 7 shows a piston blank 1 which has both a upper shoulder 5 and spaced apart from it a lower shoulder 10, which are produced by forging. In the area of the facing surfaces of the two shoulders 5 and 10 a radially circumferential recess is introduced into the piston blank 1 and then both the upper shoulder 5 and the lower shoulder 10 are positioned against the piston blank in the direction of the recess so that it is closed and the cooling channel 7 is created. Depending on the machining of the two shoulders 5, 10, it is conceivable that after being positioned against the piston blank 1, they make contact at their butt edges or can also overlap one another. Here too, it is conceivable that the two butting surfaces of the shoulders 5, 10 are rigidly joined (e.g. by welding).

LIST OF REFERENCE NUMBERS

1. Piston blank
2. Piston crown
3. Piston skirt
4. Piston boss
5. (Upper) shoulder
6. Recess
7. Cooling channel
8. Contact area
9. Ring belt
10. (Lower) shoulder

What is claimed is:

1. Process for manufacturing a cooling channel piston which has a cooling channel approximately in the area behind a ring belt, where a piston blank is shaped at least partially in a forging process, characterized in that specifically in the approximate area of a top land, at least one circumferential shoulder having a terminating free end spaced from the piston blank and having a length less than a length of the piston blank and projecting laterally from one portion of the piston blank is formed, behind the at least one shoulder a recess is introduced from a side of the piston blank and then the at least one shoulder is reshaped by means of deformation such that the recess is closed by the at least one shoulder with the terminating free end of the at least one shoulder directly connected to another portion of the piston blank to create the cooling channel.

2. Process in accordance with claim 1, wherein the reshaping takes place by forging.

3. Process in accordance with claim 1, wherein the reshaping takes place by swaging.

4. Process in accordance with claim 1, wherein the reshaping takes place by driving through a hollow form.

5. Process in accordance with claim 1, wherein the reshaping takes place by pressure rolling.

6. Process in accordance with claim 1, wherein the terminating end of the at least one shoulder is rigidly connected to said other portion or the piston blank or to another shoulder forming a contact area.

7. Process in accordance with claim 6, wherein the contact area is reworked.

8. Process in accordance with claim 6, wherein the shoulder is furnished with sealing means in the contact area with respect to the piston blank.

* * * * *